(12) United States Patent
McGuinness et al.

(10) Patent No.: US 7,054,491 B2
(45) Date of Patent: May 30, 2006

(54) SCALABLE ARCHITECTURE FOR CORRESPONDING MULTIPLE VIDEO STREAMS AT FRAME RATE

(75) Inventors: Peter J. McGuinness, San Diego, CA (US); George Q. Chen, San Diego, CA (US); Clifford M. Stein, San Diego, CA (US); Kim C. Ng, San Diego, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 543 days.

(21) Appl. No.: 09/993,970

(22) Filed: Nov. 16, 2001

(65) Prior Publication Data

US 2003/0095711 A1    May 22, 2003

(51) Int. Cl.
*G06K 9/62* (2006.01)

(52) U.S. Cl. ...................................................... 382/209
(58) Field of Classification Search ................ 382/181, 382/190, 201, 216, 218, 278, 294
See application file for complete search history.

(56) References Cited

U.S. PATENT DOCUMENTS

| 4,193,117 | A | * | 3/1980 | Marckwardt | 708/424 |
| 4,244,029 | A | * | 1/1981 | Hogan et al. | 382/218 |
| 4,864,629 | A | * | 9/1989 | Deering | 382/216 |
| 5,406,642 | A | * | 4/1995 | Maruya | 382/218 |
| 5,768,404 | A | | 6/1998 | Morimura et al. | 382/107 |
| 6,516,099 | B1 | * | 2/2003 | Davison et al. | 382/284 |
| 6,556,692 | B1 | * | 4/2003 | Gavrila | 382/104 |
| 6,584,224 | B1 | * | 6/2003 | Sun et al. | 382/217 |
| 6,606,406 | B1 | * | 8/2003 | Zhang et al. | 382/154 |
| 6,701,005 | B1 | * | 3/2004 | Nichani | 382/154 |

FOREIGN PATENT DOCUMENTS

| EP | 1 248 235 | 10/2002 |
| GB | 2272285 | 5/1994 |

OTHER PUBLICATIONS

Mazzoni, et al. "Stereocorrelation on the parallel OPENVISION system ", IEEE, pp. 427-433, 1995.*

R. Deriche et al., "Robust Recovery of the Epipolar Geometry for an Uncalibrated Stereo Rig", Proceedings of the European Conference on Computer Vision, pp. 567-576, Stockholm, Sweden, May 1994, Springer-Verlag, SNCS 800.

Z. Zhang et al., "A Robust Technique for Matching Two Uncalibrated Images Through the Recovery of the Unknown Epipolar Geometry", Artifical Intelligence Journal vol. 78, pp. 87-119, Oct. 1995.

(Continued)

*Primary Examiner*—Daniel Miriam
(74) *Attorney, Agent, or Firm*—Stephen C. Bongini; Lisa K. Jorgenson

(57) ABSTRACT

An image processing system which processes, in real time, multiple images, which are different views of the same object, of video data in order to match features in the images to support 3 dimensional motion picture production. The different images are captured by multiple cameras, processed by digital processing equipment to identify features and perform preliminary, two-view feature matching. The image data and matched feature point definitions are communicated to an adjacent camera to support at least two image matching. The matched feature point data are then transferred to a central computer, which performs a multiple-view correspondence between all of the images.

24 Claims, 5 Drawing Sheets

OTHER PUBLICATIONS

T. Kanade, A Stereo Machine for Video-Rate Dense Depth Mapping and Its new Applications, School of Computer Science, Carnegie Mellon University, IEEE Conf. Computer Vision and Pattern Recognition, 1996.

P.H.S. Torr et al., "Robust Parameterization and Computation of the Trifocal Tensor", Image and Vision Computing, 1997.

M. Pollefeys et al., Self-Calibration and Metric Reconstruction in spite of Varying and Unknown Internal Camera Parameters, IEEE International Conf. Computer Vision, 1998.

K. Ng, "3D Visual Modeling and Virtual View Synthesis: A Synergetic, Range-Space Stereo Approach Using Omni-Directional Images," Ph.D. Dissertation, University of California, San Diego, Mar. 2000.

Kim C. Ng et al., "Range-Space Approach for Generalized Multiple Baseline Stereo and Direct Virtual View Synthesis", IEEE Workshop on Stereo and Multiple-Baseline Vision, Dec. 9-10, 2001.

George Q. Chen, "Robust Point Feature Matching In Projective Space", IEEE Computer Vision and Pattern Recognition 2001.

Mazzoni, C.et al., "Sterocorrelation on the Parallel OPENVISION System", Algorithms and Architectures for Parallel Processing, IEEE, vol. 1, Apr. 1995, pp. 427-433, XP010149181.

Zhang, Z. et al., "A Robust Technique for Matching Two Uncalibrated Images Through the Recovery of the Unknown Epipolar Geometry", Artificial Intelligence, Elsevier Science Publisher B.V., Amsterdam, NL, vol. 78, No. 1/2, 1995, pp. 87-119, XP001148319.

Leung, M.K. et al., "Point Matching in a Time Sequence of Stereo Image Pairs and Its Parallel Implementation on a Multiprocessor", IEEE Computer Soc. Pr., Mar. 20, 1989, pp. 321-328, XP010014705.

Pedersini, F. et al., "Multicamera Motion Estimation for High-Accuracy 3D Reconstruction", Signal Processing, vol. 80, No. 1, Jan. 2000, pp. 1-21, XP004194268.

Zuech, N., "Are Smart Cameras Enough?", Machine Vision Online, Jan. 2001, XP002214185.

European Search Report dated Sep. 14, 2005 for European Application No. 02257732.

* cited by examiner

400

|  | FEATURE 1 | FEATURE 2 | FEATURE 3 | FEATURE 4 |
|---|---|---|---|---|
| IMAGE 1 | TRUE | FALSE | FALSE | TRUE |
| IMAGE 2 | TRUE | TRUE | FALSE | FALSE |
| IMAGE 3 | TRUE | TRUE | FALSE | TRUE |
| IMAGE 4 | FALSE | TRUE | TRUE | FALSE |

FIG. 4

SCALABLE ARCHITECTURE FOR CORRESPONDING MULTIPLE VIDEO STREAMS AT FRAME RATE

CROSS-REFERENCE TO RELATED APPLICATIONS

The present application is related to commonly owned U.S. patent application Ser. No. 09/825,266, by Chen, filed on Apr. 3, 2001, which is now U.S. Pat. No. 6,834,119 issued on Dec. 21, 2004, the entire teachings of which being hereby incorporated by reference.

BACKGROUND OF THE INVENTION

1. Field of the Invention

This invention generally relates to the field of image processing systems and methods, and more particularly relates to a system for and method of matching image features across multiple video streams in real time.

2. Description of Related Art

Much work is being done to use multiple digital video cameras in sychronization to produce three dimensional video sequences which offer viewers the ability to pan and zoom at will within the acquired scene.

A typical system to accomplish this consists of a number of cameras with overlapping fields of view. These cameras are synchronized so that the video frames are all exactly contemporaneous. This produces multiple video streams of the same scene, which can then be used to create a three dimensional database for subsequent rendering from a user specified point of view.

While methods for using multiple cameras to capture multiple video streams of a scene continue to improve, a fundamental common requirement with all of them is that a number of parameters which describe the cameras acquiring the video sequences must be known before any useful image processing can take place. These parameters include the position, orientation, aperture, and focal length of each camera, collectively referred to as the camera pose.

For the acquisition of still images, and for certain video applications, the use of fixed camera pose may be adequate, in which case the parameters can be measured and set by the operator. For many real world applications, however, the ability to determine the camera positions at the frame rate of the cameras is a significant advantage, and extends the usability of the system by enabling ad-hoc camera placement, addition and removal of cameras for dynamic coverage of a scene, and camera motion during scene capture.

The essential first step in establishing camera pose is to establish correspondence between the images. This procedure examines the images and attempts to determine which features in any one image are the same features in any of the other images. This is called correspondence. Once correspondence of a number of features across all of the views has been established, the positions of the cameras can be derived. An important point is that it is not required to establish correspondence between every pixel in every image (nor is it generally possible) since it is known that it is possible to derive camera pose from a relatively small number of correspondences.

As a first step to establishing correspondence, feature points in the images are extracted by a low level signal processing technique. This can be done in a number of ways but generally involves passing several filter kernels in sequence over the image and its derivatives so that sharp corner points in the image can be identified. As a necessary part of this, in order to retain enough arithmetic accuracy, the amount of data stored temporarily grows significantly larger than the original image.

The amount of processing required for feature detection can be reduced by including well known objects, called fiducials, or by projecting structured images in the scene and using them for correspondence. These techniques are generally not acceptable in any application where good image quality is required, and hence a system is needed which can find and correspond existing feature points.

As a second step, an attempt to match the extracted feature points with those in other images is made. This once again can be accomplished by various means but generally involves taking a small region centered around each feature point in one image and searching for a similar region in a number of other images. Since the camera pose is unknown, there are no constraints on this search, even to the extent that the feature point is visible in any of the other images, so the search must cover all parts of all the other images.

The correspondence step is further complicated by the potential for ambiguity in the images which can cause false matches to be found. A robust system must include a method for finding and rejecting these false matches, if the use of a bundle adjustment technique in the later stages is to be successful.

An example technique which establishes correspondences between multiple video streams is disclosed in "A Stereo Machine for Video-rate Dense Depth Mapping and Its New Application." Takeo Kanade, Atsushi Yoshida, Kazuo Oda, Hiroshi Kano and Masaya Tanaka, Proceedings of $15^{th}$ Computer Vision and Pattern Recognition Conference (CVPR), June 1820, 1996, San Francisco. This technique uses multiple cameras with a fixed and known physical relationship to reduce the total amount of image processing through the use of the epipolar constraint. The technique uses multiple processors to perform preliminary processing, but the preliminary processing produces a bit mapped image data set for each camera, which is a very large dataset that must be processed by a follow-on process. The amount of data produced by this system cannot be practically processed by a single processor in real time, especially when a large number of cameras are used.

The pixel level processing required for feature detection, together with the bandwidth and storage required to match points across large numbers of images limits practical implementations of this feature.

Digital cameras capture and store images using a rectangular sampling grid where each row of the grid is aligned with the raster scan line of a conventional analog camera, and each column of the grid forms a sample, called a pixel (picture element). The color of each pixel is stored either as color components, using eight bits each for red, green and blue, or as a luminance plus two chrominance fields, in which case the amount of data is reduced to 16 bits per pixel.

A typical digital TV signal has 720 columns and 485 rows, hence the amount of data is between 5,587200 bits and 8,380800 bits per image. At a typical frame rate of 30 frames per second, the aggregate data rate varies between 167,616,000 bps and 251,424,000 bps. The current state of the art in processing, storage and communication bandwidth limits any system which attempts to aggregate and process this data in a central location to a small number of cameras.

Techniques which allow development of three dimensional sequences for motion pictures, such as Light Field Rendering, require very large numbers of cameras and have severe flexibility limitations. Camera pose is determined by physical measurement of the camera locations, which completely avoids the difficulty of determining the camera positions by analysis of the captured images but has several disadvantages. These include precluding ad hoc camera placement so that, for example, a system where multiple cameras can track a moving object is not possible nor is camera movement to eliminate occlusions. Ad hoc camera placement is also desirable when recording real-life scenes such as at a news event. Using these camera placement techniques with light field rendering also means that the necessary large array of cameras must be carefully calibrated and maintained in that position, which leads to problems of manufacturability and usability. All 3D image capture systems must correct or account for variations in camera pose to avoid distortions in the computed, three-dimensional images. These variations may be caused by manufacturing tolerances, the effects of thermal expansion or secular change in the supporting materials, and damage or impact of the system, which may not be known to the operator.

Therefore a need exists to overcome the problems with the prior art as discussed above, and particularly for a scalable method and apparatus that allows two-dimensional images from multiple cameras, whose location and pose are not known a priori, to be accepted and processed in real time for the creation of a three dimensional motion picture that preferably comprises up to at least thirty frames per second from each camera.

SUMMARY OF THE INVENTION

According to a preferred embodiment of the present invention, a method corresponds multiple video streams at frame rate by matching image features between a plurality of images of a scene that were contemporaneously captured from different physical locations that are not known a priori. The preferred method comprises the step of detecting a first set of distinct image features in a first image of a first plurality of images, wherein the first plurality of images comprises images of a scene that were contemporaneously captured from different physical locations that are not known a priori. The method further comprises the step of determining a first correspondence of distinct image features between the first set of distinct image features and a at least a second set of distinct image features detected in at least a second image of the first plurality of images. The method further comprises the step of determining a final correspondence of distinct image features detected in a second plurality of images, including the first image and the at least a second image, within the first plurality of images.

According to a preferred embodiment of the present invention a system with scalable architecture for corresponding multiple video streams at frame rate comprises a plurality of image feature detectors. Each of the plurality of image feature detectors detects a set of distinct image features in one of a first plurality of images, respectively, wherein the first plurality of images comprises images of a scene that were contemporaneously captured from different physical locations that are not known a priori. The system further comprises a plurality of initial image correlators, wherein each of the plurality of initial image correlators is communicatively coupled with at least two of the plurality of image feature detectors for determining a first correspondence of distinct image features detected in at least two images of the first plurality of images. The system further comprises a final image correlator, communicatively coupled with each of the plurality of initial image correlators, for determining a final correspondence of distinct image features detected in a second plurality of images, including the at least two images, within the first plurality of images.

BRIEF DESCRIPTION OF THE DRAWINGS

FIG. 4 is a diagram of a presence matrix utilized by a preferred embodiment of the present invention.

DESCRIPTION OF THE PREFERRED EMBODIMENTS

Figure 1:
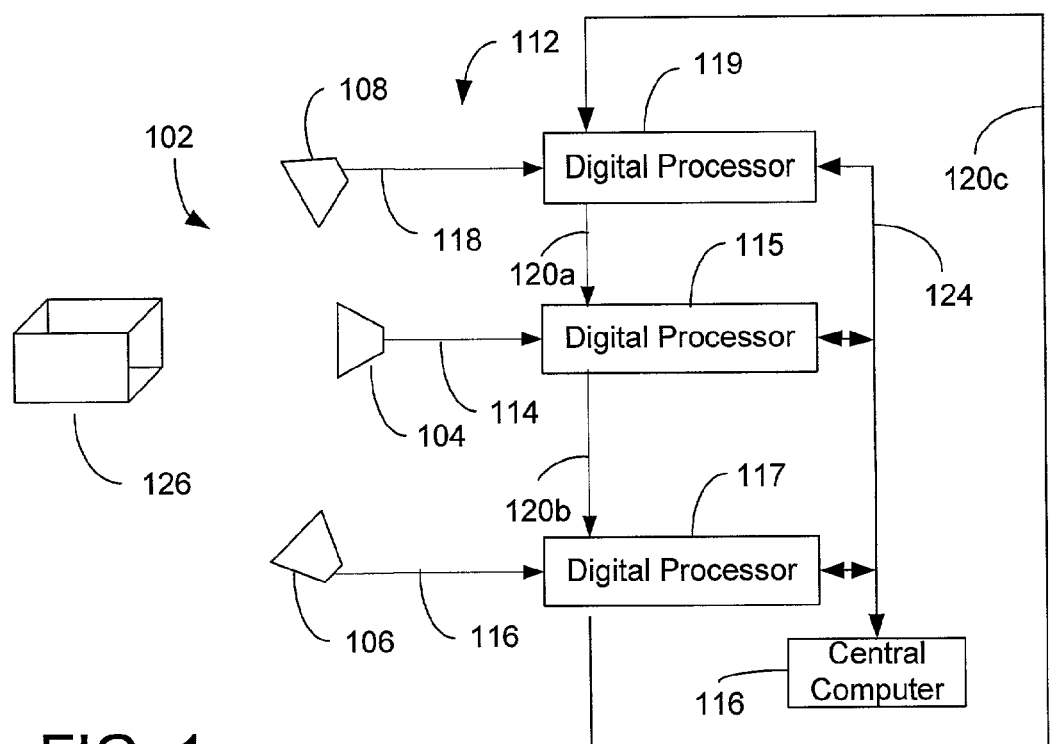
FIG. 1 is a functional block diagram showing an exemplary image matching system, according to a preferred embodiment of the present invention.

The exemplary embodiments of the present invention are designed to process, in a scalable manner and in real time, the video streams of a three dimensional scene that are captured by a variable number of video stream cameras. The location and pose of the multiple cameras capturing the video streams can be unknown, or partially known, to the image processing according to a preferred embodiment of the present invention. The image processing according to the exemplary embodiments allows the construction of video streams which portray novel views of scenes through the processing of the multiple video stream data captured by the multiple cameras. The example embodiments of the present invention determine image correlation and camera pose by processing video stream data of images that do not necessarily contain fiducials or projected light structures.

An image processing system, according to a preferred embodiment, accepts video streams captured by the multiple cameras, detects feature points in each of the images, and performs image feature point matching between pairs of images captured by adjacent video cameras. The image processing system utilizes the observation that once feature points are matched between two images, the matching of feature points across multiple images then does not need to process pixel level image data. The results of feature point matching performed on adjacent, two-view images is communicated to a central processing computer for matching of multiple view feature point correlation. The multiple view feature point correlation is then used by the image processing system to support the determination of camera pose and generation of three-dimensional motion pictures.

The image processing system preferably processes data produced at a rate that is at least on the order of twenty five Mbytes/sec from each camera. The data generated by a plurality of video stream cameras typically increases with each camera. If ten cameras are used to generate data, for example, the total amount of data generated and which is required to be processed in real time would be on the order of two hundred and fifty Mbytes/sec.

An image processing system, according to a preferred embodiment of the present invention, divides the image processing among a number of processors in order to handle the amount of data generated by these multiple cameras, such as the two hundred and fifty Mbytes/sec as discussed above. The algorithm utilized by the example embodiment is broken down into three main parts. Two of the three processing parts require processing of the entire set of captured image data in order to produce a definition of matched feature points that are identified within the images. These first two processing parts operate on the image data and produce combinations of matching feature points in pairs of images that are captured by adjacent cameras. The matched feature point data of the first two processing parts comprise a much smaller dataset than the set of original image data. The final processing part does not require the image data itself, but does require processing of data that was derived from all views that were captured of the scene. The final processing part of the example embodiment therefore operates on a central processor and only operates on the smaller data quantity results that are produced by the first two processing parts in order to produce a final set of matched feature points as an output of the system.

The image processing system, according to a preferred embodiment, utilizes a separate data processor that is associated with each camera capturing image data. Each of these separate data processors accepts data from its associated camera and performs initial processing on the entire image data set produced by that camera. The processing performed by the individual data processors produces a set of detected feature points within an image and performs a matching of those feature points with the detected feature points in a contemporaneously captured image of the same scene that was captured by a nearest neighbor camera. The image processing system communicates the specification of matched feature points, which are identified by the two-dimensional coordinates of each feature point from the multiple data processors to the central processor for final processing. The communication of only matched feature point data to a central processor, instead of a complete set of image data, results in communications of a much smaller amount of data to the central processor than is originally produced by the cameras.

The processing performed by the central processor therefore advantageously only processes the much smaller data set of matched feature point data, thereby greatly decreasing both the data communications between the data processors and the central processor as well as the processing requirements of that central processor. The processing of the matched feature point data received by the central processor produces a refined and more accurate matching of feature points across all captured images and uses these determined relationships to determine camera pose. The camera pose data determined by the central processor may then be added to the video image streams as metadata for later use in determining dense correspondence. The camera pose determined by the central processor may also be fed back to the appropriate camera so that further dense correspondence information can be extracted using the digital processors associated with that camera.

The processing performed by a preferred embodiment of the present invention is described in related U.S. patent application Ser. No. 09/825,266, by Chen, filed on Apr. 3, 2001, the entire teachings of which are hereby incorporated herein by reference. Alternative embodiments, as discussed below, may implement processing that corresponds to the processing described herein. Alternative embodiments may use, for example, a multi-baseline method, discussed by Kanade et al. in "A Stereo Machine for Video-rate Dense Depth Mapping and Its New Application." Takeo Kanade, Atsushi Yoshida, Kazuo Oda, Hiroshi Kano and Masaya Tanaka, Proceedings of $15^{th}$ Computer Vision and Pattern Recognition Conference (CVPR), June 1820, 1996, San Francisco. As another example, alternative embodiments may use a range space method, discussed by K. Ng in "3D Visual Modeling and Virtual View Synthesis: A Synergetic, Range-Space Stereo Approach Using Omni-Directional Images," Ph.D. Dissertation, University of California, San Diego, March 2000. Further, another example is described by Kim C. Ng, Mohan Trivedi, and Hiroshi Ishiguro in "Range-Space Approach for Generalized Multiple Baseline Stereo and Direct Virtual View Synthesis," IEEE Workshop on Stereo and Multiple-Baseline Vision, Dec. 9–10, 2001. The appropriate hardware designs for the various alternative embodiments will be obvious to those having ordinary skill in the relevant arts in view of the present discussion.

According to a preferred embodiment of the present invention, as shown in FIG. 1, an exemplary image matching system 100 comprises a set of digital video cameras 102, in this example represented by three cameras 104, 106, 108, being shown in this illustrated embodiment, which are arranged with different poses. Each video stream camera 104, 106, 108 is coupled to a digital processor 115, 117, 119 respectively.

The images captured by each of the video stream cameras are communicated to each of the respective digital processors for initial processing. The initial processing performed by the digital processor 115, 117, 119 includes detection of feature points within the images captured by the associated camera (as is described below)

The images captured from each camera and the detected feature descriptions, which are expressed in the preferred embodiment by the (X,Y) coordinate of the detected feature point within the image data, are communicated to that camera's "nearest neighbor" camera via inter-camera communications channels 120a, 120b, 120c in order to support the initial processing of multiple image data wherein the feature points in these two images are matched, as is described below.

In the exemplary image processing system 100, the nearest neighbor camera is selected by the connection of the inter-camera communications channel 120a, 120b, 120c. A first digital processor associated with a first camera transmits the image information and matched feature point data that was captured by the first camera to a second downstream digital processor associated with a second camera. In similar fashion, the digital processor for the first camera receives image and matched feature point data from an upstream digital processor associated with a third camera.

Each digital processor of the illustrated embodiment is connected to its "nearest neighbor" processors by the inter-camera communications channel 120a, 120b, 120c. The definition of "nearest neighbor" cameras is defined by the interconnection of the digital processors 115, 117, 119. In the example image processing system 100, an example middle digital processor 115 is connected to a downstream digital processor 117 by inter-camera communications channel 120b, and to an upstream digital processor 119 through an inter-camera communications channel 120a. The image and matched feature point data produced by each digital processor, in the present example, is communicated to a downstream digital processor to allow the downstream digital processor to perform two-view image matching.

In the present exemplary image processing system 100, the downstream digital processor 117 is connected to the upstream digital processor 119 by an inter-camera communications link 120c. The data produced by the digital processors 115, 117, 119 are then communicated to the central computer 116 via the camera-computer communications channel 124 for final processing.

At a point in time, the cameras collect a set of images, such as three captured images 114, 116, 118, being shown for the three cameras 104, 106, 108. Each image within the set of images 112 deviates from the other images in the set of images 112 by camera relative motion. For example, the first image 114 and the second image 116 can deviate from one another by a distance between corresponding feature points found on both images 114, 116, due to the different poses of the cameras 104, 106, relative to a scene 126. This camera relative motion between the two images 114, 116, can be represented by a motion vector between feature points that correspond (i.e., that match) between the two images 114, 116. The term camera relative motion, as used herein, is intended to broadly cover all alternative embodiments of the present invention wherein any combination of moving scene 126 and/or cameras 104, 106, 108, can be represented.

Figure 2:
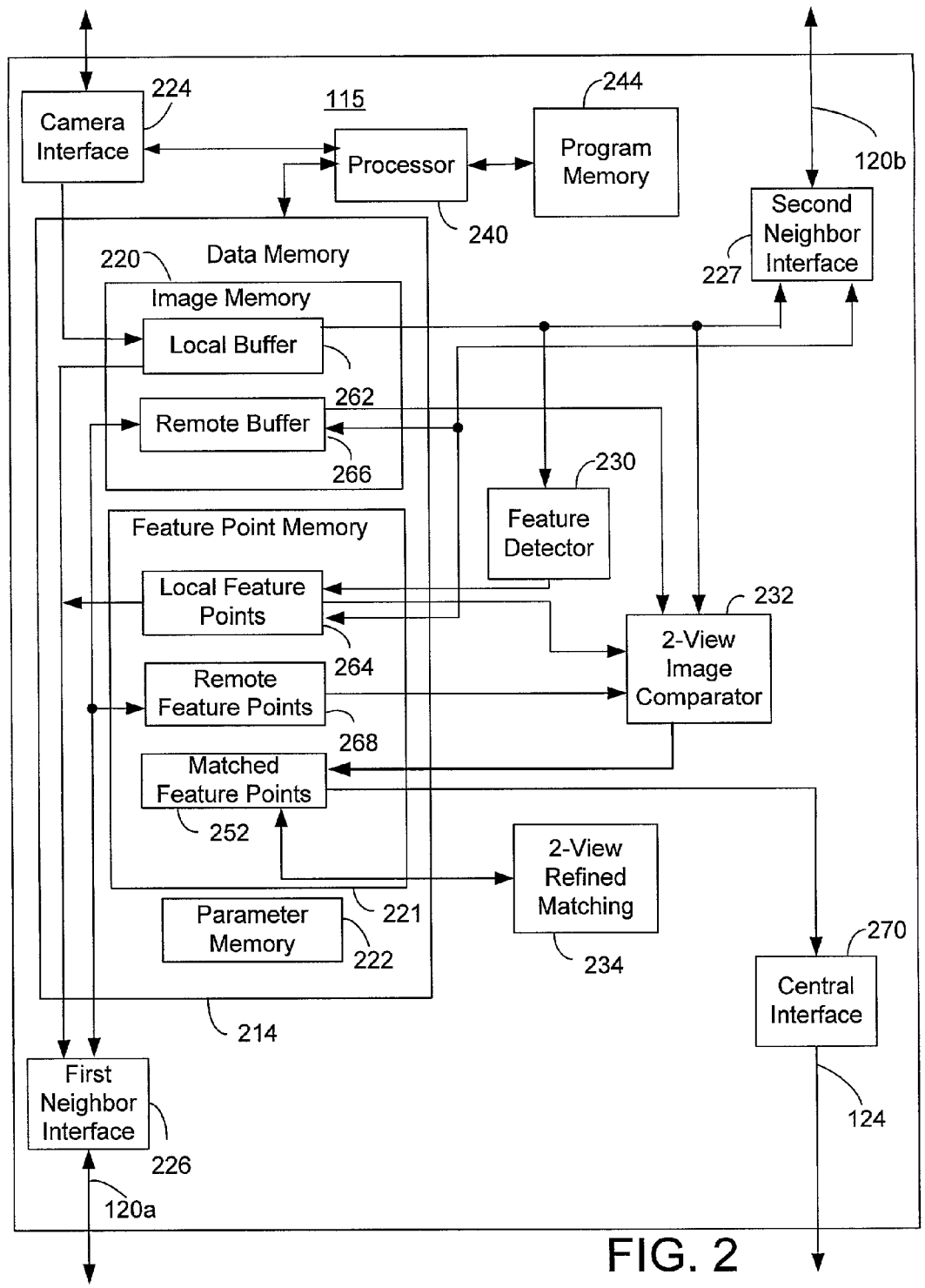
FIG. 2 is a functional block diagram illustrating a more detailed view of a digital processor within the exemplary image matching system of FIG. 1, according to a preferred embodiment of the present invention.

The digital processor 115 of the illustrated embodiment is shown in further detail in FIG. 2. The components of an exemplary digital processor 115 that is attached to camera 104, which is also representative of the other digital processors 117, 119 in the present example, that are attached to each of the other cameras 106, 108, is shown for clarity of explanation. The digital processors 115, 117, 119 each share a common architecture and similar processing is performed within each digital processor that is distributed among the cameras used by the preferred embodiment.

The exemplary digital processor 115 comprises a number of dedicated processors which process data stored in data memory 214 that contains the digital image data received from the camera associated with the exemplary digital processor 115, received through camera interface 224, and the image and detected feature point data received from the nearest neighbor camera in the example embodiment of the present invention that is received over the inter-camera communications link 120a through the first neighbor interface input 226.

The camera interface 224 accepts image data from the attached camera 104 and provides configuration and operation commands produced by processor 240. The inter-camera communications link 120, including the first inter-channel communications link 120a and second inter-channel communications link 120b in the illustrated example, transfers image and detected feature data between neighboring cameras to support initial data processing. The inter-camera communications link 120 in the preferred embodiment is implemented through an interface complying with the ITU 656 standard. It is obvious that alternative communications links that are able to communicate the necessary data between digital processors may be used by alternative embodiments, as will become obvious to those of ordinary skill in the art in view of the present discussion. Examples of such alternatives include interfaces that conform to the IEEE 1394 standard (also known under the trade names FIREWIRE or I-LINK) and the USB2 interface standard.

The exemplary embodiment of the present invention implements processing that performs two-image correlation within the digital processor 115. Alternative embodiments of the present invention may implement processing which performs correlation among three or more images within each digital processor 115. An example of such an alternative embodiment may implement a trifocal tensor method within the digital processor 115. The trifocal tensor method requires comparison of three images. Such an alternative embodiment may utilize bi-directional inter-camera communications links 120 between the digital processors 115, 117 and 119.

Bi-directional communications links between the digital processors allow image data, and detected feature point data if required, that was captured by the two neighboring cameras to be transferred, from the local buffer 262 and the local feature point buffer 264, to the digital processor 115 for simultaneous processing with the image data captured by the attached camera 104. Other alternative embodiments may use additional inter-camera communications links between additional cameras in order to allow a larger number of images and feature point data to be available at each digital processor 115 for processing. Other alternative embodiments may configure the digital processors 115 to also "pass through" data received from neighboring cameras so as to make additional image and feature point data available at each digital processor 115.

The exemplary digital processor 115 of the preferred embodiment further comprises dedicated data processors that include a feature detector 230, a two-view image comparator 232, and a two-view refined matching processor 234, that all operate in parallel in order to maintain the processing throughput required for practical, real time image processing. The functions of these processors within the example embodiment are described in more detail below.

The exemplary digital processor 115 contains data memory 214. The data memory 214 includes an image memory 220 and a feature point memory 221. The image memory 220 contains a local image buffer 262 to contain the image data received through the camera interface 224. The image memory 220 also contains a remote image buffer 266 to contain the image data received from the neighboring camera through the neighbor interface input 226 of the present example. The feature point memory 221 contains memory for a local feature points buffer 264, a remote feature points buffer 268 and a matched feature points buffer 252. The local feature point buffer 264 is used to store feature point definitions that were detected by the feature detector 230 for the image data received from the camera interface 224. The remote feature points 268 data buffer stores feature point definitions that are received from the neighboring camera through the neighbor interface input 226 of the present example. The image data within the local image buffer 262 and the detected feature points stored in the local feature points buffer 264 are communicated to the next neighboring camera through neighbor interface output 227.

The data memory 214 is electrically coupled to the feature detector processor 230, the 2-view image comparator processor 232 and the 2-view refined matching processor 234 that are within the digital processor 115. The feature point memory 221 further comprises a matched feature points buffer 252 that stores the matched feature points that are determined by the 2-view image comparator 232 and refined by the 2-view refined matching processor 234 that are within the exemplary digital processor 115 as will be discussed in more detail below. Additionally, the data memory 214 includes a parameter memory 222 where the processors within the digital processor 115 store configuration and computational parameters.

The dedicated processors of the example embodiment include the feature detector 230 which is an image feature detector that processes the image data contained in the local buffer 262 to detect distinct image features that are feature points within the image contained in the local buffer 262. The 2-view image comparator 232 is an initial image correlator that determines a first correspondence of image features between the images stored in the local buffer 262 and the remote buffer 266 through analysis of those two images and the feature points stored in the local feature points buffer 264 and the remote feature points buffer 268. The 2-view image comparator 232 of the example embodiment receives detected feature points from the remote feature points buffer 268. The detected feature points within the remote feature point buffer were detected in the example embodiment by a feature point detector in a different digital processor—a digital processor associated with a neighboring camera, e.g., a first neighboring digital processor 117 that is associated with a first neighboring camera 106. The communication of detected feature points from a neighboring digital processor, e.g., the first neighboring digital processor, results in the 2-view image comparator also being communicatively coupled with the feature detector 230 that is contained within that first neighboring digital processor 117. Communicatively coupled in this context is meant to encompass all means and methods of communicating data and instructions between physical entities of the particular embodiment. The 2-view image comparator 232 stores the first correspondence within the matched feature points memory buffer 252. The 2-view refined matching processor 234 of the example embodiment performs additional processing to refine the first correspondence that is stored in the matched feature points memory buffer 252.

The exemplary digital processor 115 includes a processor 240 and a program memory 244. The processor 240 coordinates operations of the digital processor 115 and executes program code stored in program memory 244. The feature detector 230, 2-view image comparator 232, and the 2-view refined matching processor 234, of the present example embodiment are implemented with dedicated, specific purpose digital hardware within the digital processor 115. The operation of the dedicated, specific purpose digital hardware is preferably coordinated by the processing of the processor 240. Alternative embodiments, as will be appreciated by those of ordinary skill in the art in view of the present discussion, may incorporate processing software modules within the program memory 244, for execution by one or more processors 240, to perform some or all of the processing of the feature detector 230, 2-view image comparator 232, and the 2-view refined matching processor 234. These processing modules may further be incorporated in a digital processor similar to digital processor 115, or within a single processor that processes image streams captured by multiple cameras by partitioning the processing within the processor 240 and/or memory 244.

Each digital processor 115, 117, 119 of the illustrated embodiment is communicatively coupled to a central computer system 116. The digital processor associated with each camera in the example embodiment produces a set of correlated feature points that have been identified between the image captured by that camera and the image captured by that camera's nearest neighbor. The correlated feature points are communicated to the central computer system 116 through the camera-computer communications channel 124 in the example embodiment. All digital processors of the present example communicate to a central computer 116 via the camera-computer communications channel 124, which is implemented in this example through a Firewire network interface. It is obvious that other communications techniques between the digital processors 115, 117, 119, and the central computer 116 may be used, as should be obvious to those of ordinary skill in the art in view of the present discussion.

The central computer system 116 of the present example stores this data which is received from the digital processor associated with each camera and then performs the multiple view correspondence processing according to a preferred processing, as will be described in more detail below. The preferred embodiment does not communicate the image data from the cameras, or the digital processors associated with them, to the central computer 116. This processing architecture reduces the processing requirements on the central computer 116 and reduces the data transmission requirements from the digital processors 115, 117, 119 and the central computer 116 so as to allow practical and economic communications of the data to the central computer 116. Other processing techniques which divide multiple image processing among multiple processors may also be used to realize alternative embodiments of the present invention.

A preferred embodiment of the present invention distributes the preliminary, two-view correspondence among the multiple cameras that collect the image data. This architecture provides a scalable processing architecture wherein much of the additional processing associated with additional image views, due to the use of additional cameras, is distributed among and performed by separate processors associated with those additional cameras. This distribution of processing into the additional cameras results in an ability to add image views with much less increase in central processing than would be required with centralized processing of all image data. The preferred embodiment performs the multiple-view processing in a central computer 116 for efficient processing of the multiple view image data. This is a significant advantage of the present invention that is not available in prior art image processing systems.

Figure 3:
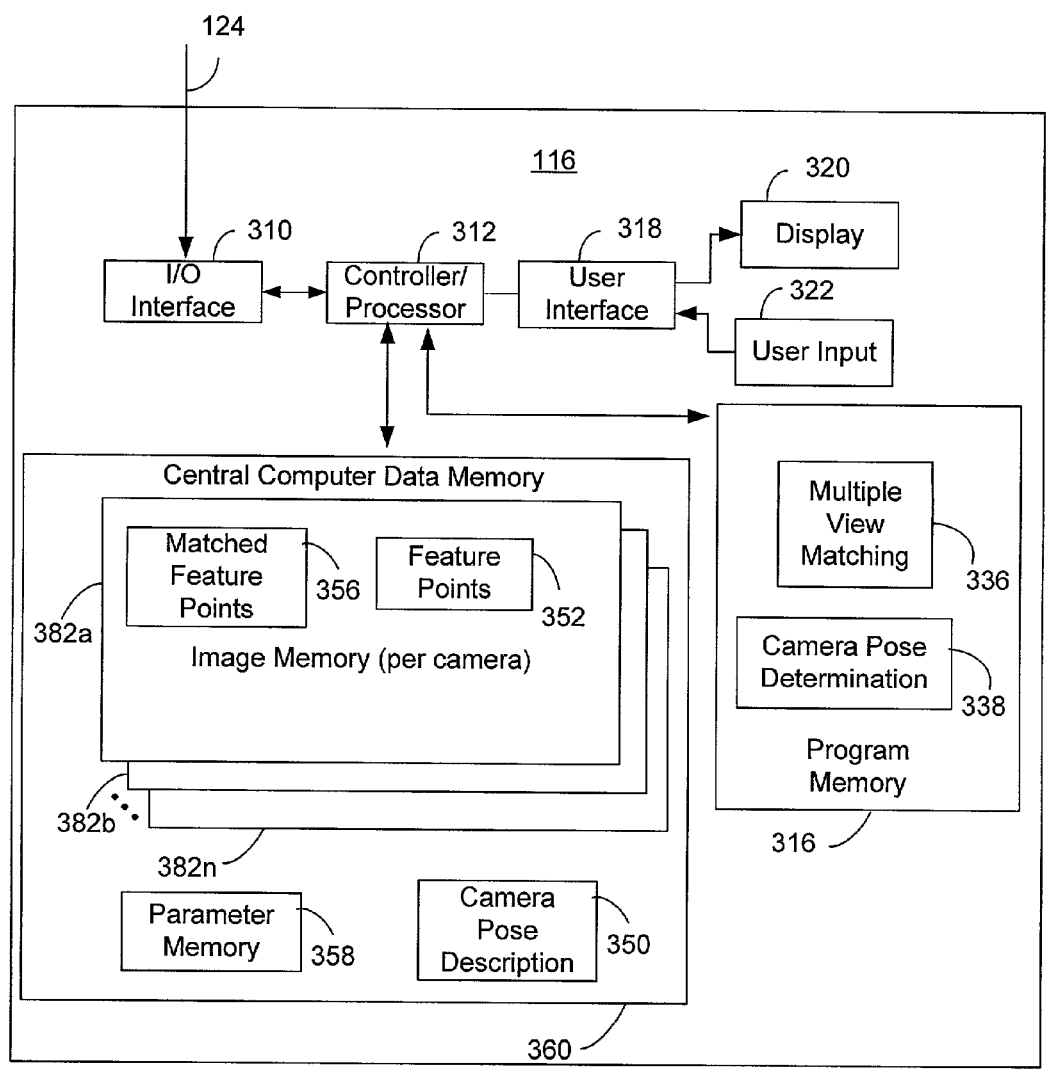
FIG. 3 is a functional block diagram illustrating a more detailed view of a central computer within the exemplary image matching system of FIG. 1, according to a preferred embodiment of the present invention.

The central computer system 116 of the example embodiment is shown in further detail in FIG. 3. The central computer system 116 preferably comprises a controller/processor 312 that is electrically coupled to a central computer data memory 360 and to program memory 316. The controller/processor 312 is also preferably electrically coupled to a user interface 318 that presents information to a user, such as via a monitor display 320, and receives user input from the user via a user input 322, such as a keyboard (not shown) and a mouse (not shown) of the preferred embodiment.

The program memory 316 of the example embodiment provides computer program instructions for the controller/processor 312 for performing operational sequences for the multiple-view robust matching processing module 336 and for the camera pose determination module 338. The multiple-view robust matching processing module 336 performs the functions of a final image correlator in the example embodiment.

The central computer data memory 360 includes storage for each set of feature point and feature point correspondence data received from each digital processor that is associated with each camera. The preferred embodiment illustrated in FIG. 3 shows a first set of image feature data 382a that was received from a digital processor associated with a first camera, a second set of feature data 382b received from the digital processor associated with a second camera, and an nth set of feature data 382n that was received from an nth camera. The central processor stores the data received for each image from each digital processor and performs processing upon that data, as described below.

The m-view robust matching module 336, according to the present example, operates only upon the matched feature points that are contained within each image. The various images captured by the various cameras may not all contain the same feature points due to the different views of the object 126. In an extreme example, an image captured by a camera with a view of one side of the object 126 may have few, if any, feature points in common with a captured image of the object's opposite side. The processing of the preferred embodiment accommodates feature points not shared by the different images of a scene, as long as adjacent images share a number of feature points. This results in the possibility that a set of multiple images of a scene may contain some of those images, i.e. views of the scene, which have no shared feature points. The processing of the preferred embodiment maintains a feature point presence matrix 400 as illustrated in FIG. 4. The feature point presence matrix 400, according to this example, contains one row for each image and one column for each feature point. The presence of a feature point in an image is indicated by a "true" indicator in the related position of the matrix, while a "false" indicator in a position indicates that the feature point is not present in the related image. The m-view matching processing only processes the feature points that are shared by two or more images, as indicated by the contents of the presence matrix 400.

According to a preferred embodiment of the present invention, significant portions of the system 100 may be implemented in integrated circuits. For example, functional components of the computer system 116 may be implemented in at least one integrated circuit. Similarly, significant portions of the digital processors 115, 117, 119, can be implemented in at least one integrated circuit.

A digital processor associated with each camera, according to a preferred embodiment of the present invention, contains three of the four image correspondence processing stages used by the preferred embodiment. The first image correspondence processing stage is the feature point detector 230 which performs feature point detection processing. The second image correspondence processing stage is performed by the two-view image comparator 232. Typically, some potential matches of image features are found in that second stage. These potential matches provide a starting point for the next stage. All potential matches of image features within the two nearest neighbor images are then found in the third stage, which is performed by the two-view refined matching processor 234. The two-view refined matching processor 234, which operates in parallel for all captured image views within the multiple processors that are associated with each camera, advantageously reduces the contamination rate (ratio of outliers to all candidates) to less than 10% so that only a small number of iterations are needed in the fourth stage, i.e. the multiple view matching stage 336, which is performed with only the matched feature point definitions of all of the captured images within the central computer 116 of the preferred embodiment. This makes the overall approach very efficient and enhances the commercial viability of any implementation utilizing the present invention. After the multiple image views are correlated, camera pose processing within the central computer 116 determines the camera poses for each camera.

The above description defines the processing performed by the example embodiment of the present invention. It is obvious that alternative processing algorithms may be performed to achieve the functionality of a system which implements the present invention.

Continuous Operation of the Image Matching Determination System

The preferred embodiment of the present invention operates continuously as the video stream cameras, e.g. the three camera 104, 106, 108 of the example embodiment, continuously capture images. The captured image data is continuously processed by the digital processors, e.g. the three digital processors 115, 117, 109 of the example embodiment, and the central computer 116. The continuously captured images processed by the central computer 116 may be processed into a 3-dimentional movie once the feature points of all of the images have been matched according to the processing described above.

Figure 5:
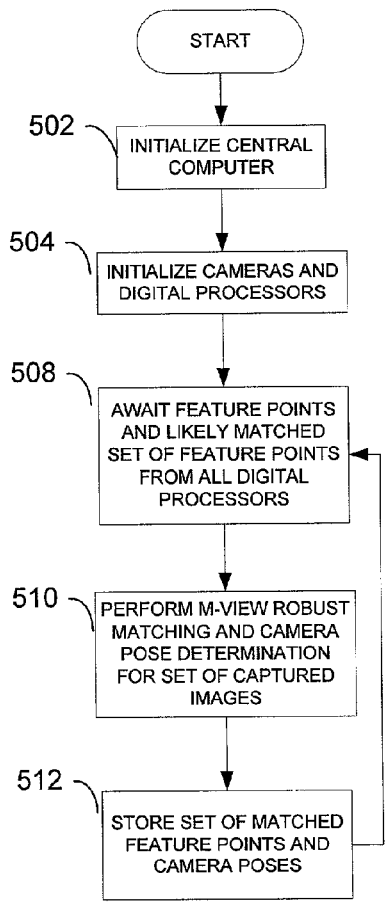
FIG. 5 is an operational flow diagram of the processing performed by the central computer according to a preferred embodiment of the present invention.

An exemplary continuous processing loop 500 performed by the central computer 116 of the preferred embodiment of the present invention is illustrated in FIG. 5. Processing starts with initialization, at step 502, of the local storage and other facilities by the processing software within the central computer 116. Once the central computer software is initialized, processing continues, at step 504, with a command to the cameras and digital processors to initialize their processing. The initialization command is communicated to the digital processors via the camera-computer communications channel 124.

The processing within the central computer 116 then enters a frame processing loop formed by steps 508 through 512 which processes the feature points from all of the images captured by all of the cameras that were captured at approximately the same time, so as to produce a data set for a single image frame that can, for example, be used to generate a three-dimensional image of that frame. The processing within the frame processing loop collects a list of matching feature points within those images from each camera that were captured at about the same time. The processing then produces data consisting of a series of images, image correspondence data identifying matching points within the images that were captured at the same time, and a definition of relative camera positions from which each image that was captured.

The frame processing loop starts with the processing, at step 508, wherein feature point definitions and the two-view likely match set of image feature point data are received from each camera and digital processor. The processing with the central computer 116 then advances, at step 510, to an M-view robust matching processing, as is described above. The central computer 116, at step 510, also produces a definition of the relative camera poses used to collect the images. The central computer 116, at step 512, then stores the images, the set of matched feature points among the images, and the relative camera poses for that image. Processing then, at step 508, is suspended until the next set of data from the cameras and digital processors is received.

Figure 6:
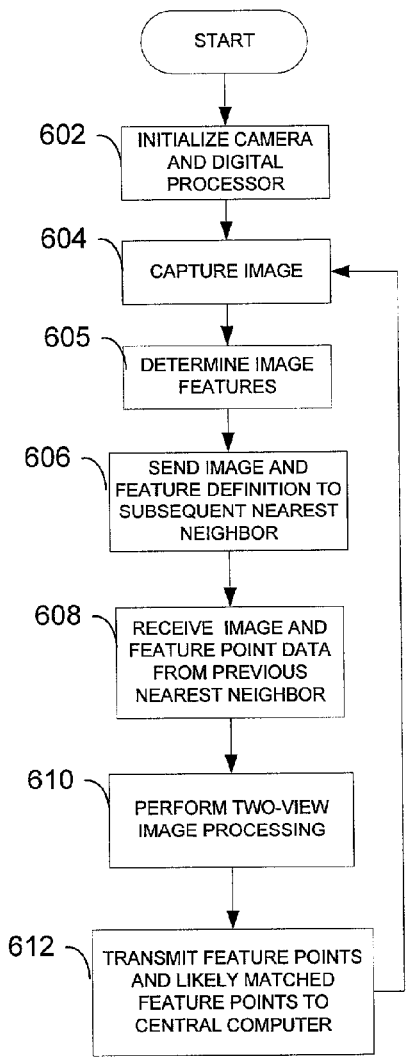
FIG. 6 is an operation flow diagram of the processing performed by a digital processor according to a preferred embodiment of the present invention.

A repetitive camera processing 600, which is performed in each digital processor associated with a camera, is illustrated in FIG. 6. The repetitive camera processing begins, at step 602, wherein the camera and digital processor are initialized. Camera and digital processor initialization, in a preferred embodiment, includes the transmission of configuration data to the camera and digital processor by the central computer 116.

Once the camera and digital processor are initialized and configuration data received, the digital processor and associated camera enter a processing loop wherein each image of a time-series of images is processed. The processing loop begins with, at step 604, an image being captured by the camera. The digital processor then proceeds, at step 605, to process the captured image data to identify feature points within the data. The image captured in step 604 and the feature points calculated in step 605 are communicated to the nearest neighbor camera, at step 606. The digital processor will then receive, at step 608, the image captured by a nearest neighbor camera and the identified features that were calculated by the digital processor associated with the nearest neighbor camera. The preferred embodiment, as described above, identifies the feature points within an image in the digital processor associated with the camera that captured that image. It is clear that alternative embodiments may only transfer image data between nearest neighbor cameras and identify the feature points of the nearest neighbor image in the receiving camera prior to two-view image processing.

The processing within the digital processor then continues, at step 610, to the two-view processing described above being performed for the image captured in step 604 and received in step 608. After production of the two-view image data, at step 610, a feature point list and most likely matched feature points are transmitted to the central computer 116, at step 612. Processing then returns to, at step 604, a new image being captured.

Discussion of Alternative Embodiments

The preferred embodiments discussed above represent a practical and economical realization of the present invention. Other embodiments of the present invention will also realize the benefits of the above teachings.

The use of alternative algorithms to process the multiple images captured by the multiple cameras may be incorporated into alternative preferred embodiments of the present invention. The division of processing among an initial processing stage which processes a subset of images to produce an initial image correspondence estimate of distinctive image pixel patterns and a final processing stage, which combines and refines the multiple initial correspondence estimates, allows a practical system to be produced that may efficiently process multiple images to produce a three-dimensional motion picture in real time. The division of the initial processing of a subset of images of a scene that are captured also allows a scaleable implementation where additional cameras and their captured images may be processed without appreciable increase in the processing delay of the image processing system.

The present invention uses a division of the initial processing of the image data, which requires the processing of a large amount of image data, into processes executing in parallel allowing real time processing of multiple images of the same scene. The results of the initial processing are then communicated to a central computer 116 for final processing. Examples of other image processing methods that may be applied to the disclosed divided processing architecture include the following.

The methods to implement image feature detection, as performed by the feature detector 230 of the example embodiment, may be alternatively performed by the method taught in S. M. Smith. Method for digitally processing images to determine the position of edges and/or corners therein for guidance of unmanned vehicle. Disclosed in UK Patent 2272285. Proprietor: Secretary of State for Defence, UK. Jan. 15, 1997.

The methods to implement 2-view image matching, as performed by the 2-view image comparator 232 and the 2-view refined matching processor 234 of the example embodiment, may be alternatively performed by the methods taught in the following references.

Z. Zhang, R. Deriche, Q. -T. Luong and O. Faugeras. "A Robust Approach to Image Matching: Recovery of the Epipolar Geometry", in Proc. Int'l Symposium of Young Investigators on Information\Computer\Control, pages 7–28, Beijing, China, February 1994.

R. Deriche, Z. Zhang, Q. -T. Luong and O. Faugeras. "Robust Recovery of the Epipolar Geometry for an Uncalibrated Stereo Rig", in ECCV94, Vol. I, pages 567–576, Stockhom, Sweden, May 1994.

Z. Zhang, R. Deriche, O. Faugeras and Q. -T. Luong. "A Robust Technique for Matching Two Uncalibrated Images Through the Recovery of the Unknown Epipolar Geometry", Artificial Intelligence Journal, Vol.78, pages 87–119, October 1995. Also Research Report No.2273, INRIA Sophia-Antipolis. Also in Proc. 3rd Int'l Conf. Automation Robotics Computer Vision, pages 1102–1106, Singapore, November 1994.

The multiple view image processing performed by the central computer 116 as well as the 2-view image processing of the 2-view image comparator 232 and the 2-view refined matching processor 234 of the exemplary embodiment may be alternatively performed according to the trifocal tensor method described in: "Robust Parameterization and computation of the Trifocal Tensor" P. H. S. Torr, A. Zisserman, Image and Vision Computing 15, 1997, 591605.

Note that, although example embodiments discussed above show 2-view image processing, an alternative implementation contemplated by the teachings of the present invention may include matching of image features over a plurality of camera views. In a particular example, a 3-view image comparator may be resident in the digital processors 115, 117, 119, and a triple set of image data buffers may be resident in the data memory 220, thereby facilitating a trifocal tensor method. Additionally, note that the bi-directional communication capability of the neighbor interfaces 120a, 120b, of the digital processors 115, 117, 119, facilitates communicatively coupling of image data between any of the digital processors 115, 117, 119. Therefore, in this particular example, image feature points of three views could be processed contemporaneously utilizing a trifocal tensor method.

The multiple view image processing performed by the central computer 116 as well as the 2-view image processing of the 2-view image comparator 232 and the 2-view refined matching processor 234 of the example embodiment may also be alternatively performed according an Autocalibration method: Auto-calibration—M. Pollefeys, R. Koch and L. Van Gool. "Self-Calibration and Metric Reconstruction in spite of Varying and Unknown Internal Camera Parameters", International Journal of Computer Vision, 32(1), 7–25, 1999.

The present invention may also be advantageously implemented on a partitioned processor which is configured to separately process multiple subsets of images within separate processes in separate memory partitions, or within a multiple process environment to produce a series of initial image correspondence data sets and then perform final processing of those initial image correspondence estimates.

It is also obvious that alternative embodiments of the present invention may perform the processing of the central processor 104 in the illustrated embodiment by distributing that processing among processors that are associated with two or more cameras. These embodiments may collocate the data processor and a secondary processor with each camera and communicate the data among the secondary processors to implement the processing of the central processor 104. A secondary processor in these embodiments may be associated with each camera, or with only a subset of cameras.

Image Matching and Camera Pose Determination System Realization

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus or integrated circuit adapted for carrying out the methods described herein—is suited. A typical combination of hardware and software could be a general purpose computer system with a computer program that, when being loaded and executed, controls the computer system such that it carries out the methods described herein. In this specification, a system element may be comprised of a software program which executes on a hardware processor. The element may then be referred to as the instructions which cause execution of the required processing, and that element is then communicatively coupled to a hardware processor to implement the functionality.

The present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

The image matching system according to the present invention provides significant advantages over the known prior art. The present image matching system divides the data intensive processing among processors that are associated with each camera that is capturing video images. This architecture allows much faster processing of multiple video image streams and provides a scalability in the number of cameras by allowing additional cameras to be added to the system while allowing real time processing of the video images captured by these multiple cameras, at video data rates on the order of thirty frames-per-second, in order to match the images of the multiple cameras to each other and to support the production of a three-dimensional video presentation.

Accordingly, due to the remarkable efficiency of the embodiments of the present invention, an implementation in an integrated circuit (IC) chip is very feasible and desirable. Generally, a circuit supporting substrate and associated circuits, such as provided by an IC, a circuit board, and a printed circuit card, and other similar embodiments, and including the functional modules according to the present invention as discussed above, can provide a modular solution for enabling a computer system to benefit from the very accurate image matching methods according to the present invention.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. An image processing system comprising:
a plurality of image feature detectors, wherein each image feature detector within the plurality of image feature detectors detects a set of distinct image features in at least one of a first plurality of images, wherein the first plurality of images comprises images of a scene that were captured from different physical locations whose physical location is not known a priori;
a plurality of initial image correlators, wherein each initial image correlator within the plurality of initial image correlators is communicatively coupled with at least one of the image feature detectors within the plurality of image feature detectors, with each initial image correlator within the plurality of initial image correlators determining a respective first correspondence of distinct image features within at least two images of the first plurality of images, the plurality of initial image correlators thereby determining a plurality of correspondences;
a final image correlator, separate from the plurality of initial image correlators, for determining a final correspondence of distinct image features detected in a second plurality of images by processing the first set of distinct image features, the second set of distinct image features, and the plurality of correspondences; and
a communications interface communicatively coupling each of the plurality of initial image correlators to the final image correlator in order to communicate the first set of distinct image features, the second set of distinct image features, and the first correspondence from each of the plurality of initial image correlators to the final image correlator, and wherein each inital image correlator computes a first likely match set of distinct image features that is determined to have a maximum average strength of correspondence based at least in part on a total number of matching neighbor distinct image features for each match of the first likely match set.

2. An image processing system according to claim 1, wherein distinct image features are feature points.

3. An image processing system according to claim 1, wherein each image within the first plurality of images and within the second plurality of images is one image within a real time motion picture.

4. An image processing system according to claim 1, wherein a first image feature detector within the plurality of image feature detectors and a first initial image correlator within the plurality of initial image correlators are communicatively coupled to a first digital processor that is communicatively coupled to a first camera for capturing at least one image of the plurality of images.

5. An image processing system according to claim 4, wherein each initial image correlator within the plurality of initial image correlators and the final image correlator are separate from one another, and wherein the communications interface provides a communications channel for each correspondence determined by each initial image correlator.

6. An image processing system of claim 1, wherein each initial image correlator computes a first likely match set of distinct image features that is determined to have a maximum average strength of correspondence based at least in part on a total number of matching neighbor distinct image features for each match of the first likely match set.

7. An image processing system of claim 1, wherein the final image correlator refines the first correspondence, resulting in at least a second potential match set of image features between the at least two images, wherein the at least a second potential match set is based at least in part on a computation of reprojection error for matched distinctive image points that result from a projective reconstruction of the at least a second potential match set.

8. An image processing system of claim 7, wherein the at least a second potential match set is based at least in part on a least median of squares computation of the reprojection errors related to matched distinctive image points in the at least a second potential match set.

9. A method of matching image features between a plurality of images, the method comprising the steps of:
detecting, by a first processor, a first set of distinct image features in a first image of a first plurality of images, wherein the first plurality of images comprises images of a scene that were contemporaneously captured from different physical locations which are not known a priori;
determining, by the first processor, a first correspondence of distinct images features "determined to have a maximum average strength of correspondence" between the first set of distinct image features and at least a second set of distinct image features detected within at least a second image of the first plurality of images;
communicating the first set of distinct image features, the second set of distinct image features, and a plurality of correspondences of distinct image features to a second processor, wherein the plurality of correspondences comprises the first correspondence; and
determining, by the second processor, a final correspondence of distinct image features detected in a second plurality of images by processing the first set of distinct image features, the second set of distinct image features, and the plurality of correspondences, and wherein the step of determining a first correspondence comprises the step of producing a first likely match set of distinct image features that is determined to have a maximum average strength of correspondence based at least in part on a total number of matching neighbor distinct image features for each match of the first likely match set.

10. A method according to claim 9, wherein distinct image features are feature points.

11. A method according to claim 9, wherein the steps of the method are performed repeatedly to process real-time video data.

12. A method according to claim 9, wherein the step of detecting and the step of determining a first correspondence are performed in the first processor that is associated with a camera which captured the first image.

13. The method of claim 9, wherein the step of determining a first correspondence comprises the step of producing a first likely match set of distinct image features that is determined to have a maximum average strength of correspondence based at least in part on a total number of matching neighbor distinct image features for each match of the first likely match set.

14. The method of claim 9, wherein the step of determining a final correspondence comprises the step of determining a refinement of the first correspondence that results in at least a second potential match set of image features between the first image and the at least a second image, wherein the at least a second potential match set is based at feast in part on a computation of reprojection error for matched distinctive image points that results from a projective reconstruction of the at least a second potential match set.

15. The method of claim 14, wherein the at least a second potential match set is based at least in part on a least median of squares computation of the reprojection errors related to matched distinctive image points in the at least a second potential match set.

16. The method of claim 9, wherein the first plurality of images further comprises a third image, the method further comprising:
detecting, by a third processor, a third set of distinct image features in the third image;
determining, by the third processor, a second correspondence of distinct image features between the third set of distinct image features and at least the second set of distinct image features; and
communicating, as part of the plurality of correspondences of distinct image features, the second correspondence to the second processor, and
wherein the second plurality of images comprises the first image, the at least a second image, and the third image.

17. The method of claim 9, wherein the at least a second image comprises a second image and a third image, the method further comprising:
detecting, by a third processor, a third set of distinct image features in the third image, and
wherein the determining a second correspondence comprises comparing three images using a trifocal tensor method, and
wherein the communicating further comprises communicating the third set of distinct image, features and, as part of the plurality of correspondences of distinct Image features, the second correspondence to the second processor.

18. A computer readable medium including computer instructions for matching image features between a plurality of images, the computer instructions comprising instructions for:
detecting, by a first processor, a first set of distinct image features in a first image of a first plurality of images, wherein the first plurality of images comprises images of a scene that were contemporaneously captured from different physical locations which are not known a priori;
determining, by the first processor, a first correspondence of distinct images features "determined to have a maximum average strength of correspondence" between the first set of distinct image features and at least a second set of distinct image features detected within at least a second image of the first plurality of images;
communicating the first set of distinct image features, the second set of distinct image features, and a plurality of correspondences of distinct image features to a second processor, wherein the plurality of correspondences comprises the first correspondence; and determining, by the second processor, a final correspondence of distinct image features detected in a second plurality of images by processing the first set of distinct image features, the second set of distinct image features, and the plurality of correspondences, and wherein the instructions for determining first correspondence comprise instructions for producing a first likely match set of distinct image features that is determined to have a maximum average strength of correspondence based at least in part on a total number of matching neighbor distinct image features for each match of the first likely match set.

19. A computer readable medium according to claim 18, wherein distinct image features are feature points.

20. A computer readable medium according to claim 18, wherein the instructions are performed repeatedly to process real-time video data.

21. A computer readable medium according to claim 18, wherein the instructions for detecting and the instructions for determining a first correspondence are executed in the first processor that is associated with a camera which captured the first image.

22. The computer readable medium according to claim 18, wherein the instructions for determining first correspondence comprise instructions for producing a first likely match set of distinct image features that is determined to have a maximum average strength of correspondence based at least in part on a total number of matching neighbor distinct image features for each match of the first likely match set.

23. The computer readable medium according to claim 18, wherein the instructions for determining a final correspondence comprises instructions for determining a refinement of the first correspondence that results in at least a second potential match set of image features between the first image and the at least a second image, wherein the at least a second potential match set is based at least in part on a computation of reprojection error for matched distinctive image points that results from a projective reconstruction of the at least a second potential match set.

24. The computer readable medium according to claim 23, wherein the second potential match set Is based at least in part on a least median of squares computation of the reprojection errors related to matched distinctive image points in the at least a second potential match set.

* * * * *